United States Patent Office 3,495,162
Patented Feb. 10, 1970

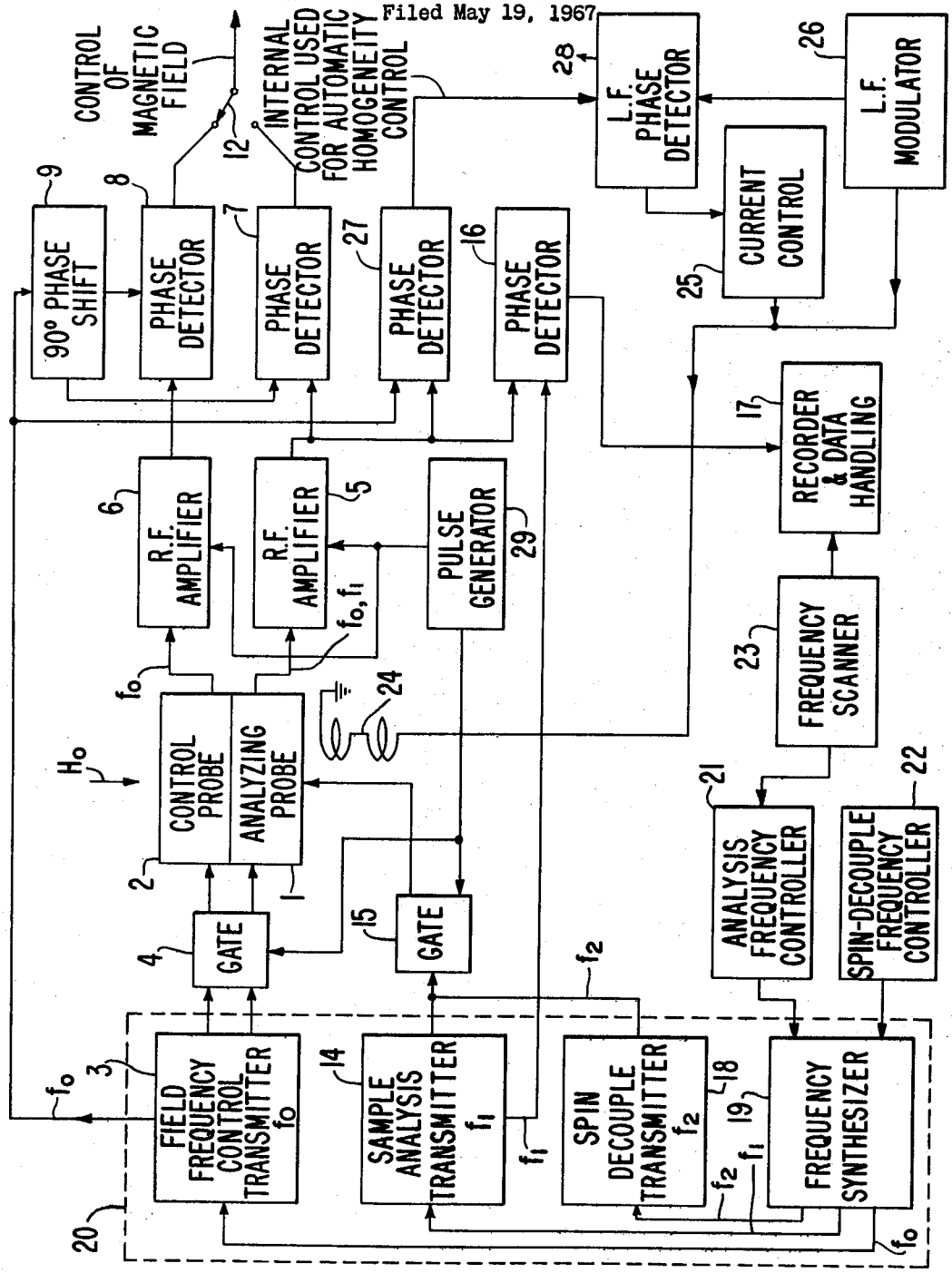

3,495,162
PULSED GYROMAGNETIC RESONANCE
SPECTROMETER EMPLOYING AN IN-
TERNAL CONTROL SAMPLE AND
AUTOMATIC HOMOGENEITY CONTROL
Forrest A. Nelson, Palo Alto, Calif., assignor to Varian
Associates, Palo Alto, Calif., a corporation of California
Filed May 19, 1967, Ser. No. 639,855
Int. Cl. G01n 27/00; G01r 33/08
U.S. Cl. 324—.5                                    8 Claims

ABSTRACT OF THE DISCLOSURE

A gyromagnetic resonance spectrometer is disclosed in which the various transmitters for exciting gyromagnetic resonance of various groups of resonant bodies are gated on when the resonance receivers are gated off and vice versa, whereby leakage signals from the transmitters to the receivers are prevented. The spectrometer includes a freqency synthesizer for synthesizing plural transmitter signals, one for field-frequency control, one for spin-decoupling, and one for analysis of a sample under investigation.

A pair of resonance probe assemblies are disposed in the polarizing magnetic field, one for external field-frequency control and the other for analysis of the sample under investigation and for providing an internal field-frequency control capability. Magnetic shim coils are provided for cancelling certain residual magnetic field gradients within the sample under analysis.

An automatic magnetic field homogeneity control channel modulates the current in the shim coils while observing resonance of an internal control group to derive an error signal for optimizing homogeneity of the magnetic field within the sample under analysis.

DESCRIPTION OF THE PRIOR ART

Heretofore, pulsed gyromagnetic resonance spectrometers have been built incorporating plural transmitters for external field-frequency control, spin-decoupling and for resonance of a sample under analysis. Such a prior art spectrometer is described in an article titled, "Time-Sharing Modulation at 200 kc. Applied to Broad and Narrow Line NMR for Base-Line Stability," appearing in The Review of Scientific Instruments, vol. 36, number 10 of October 1965 at p. 1495. While such a spectrometer provides improved base-line stability, it does not provide automatic field homogeneity control and as a result, resolution of the output resonance spectra is adversely affected.

SUMMARY OF THE PRESENT INVENTION

The principal object of the present invention is the provision of an improved pulsed gyromagnetic resonance spectrometer.

One feature of the present invention is the provision, in a pulsed gyromagnetic resonance spectrometer, of an automatic magnetic field homogeneity control channel, whereby the resolution of the output resonance spectra is improved.

Another feature of the present invention is the same as the preceding feature wherein the homogeneity control channel includes a modulator for modulating the current supplied to certain magnetic field shim coils to derive a control signal for controlling the current to the shim coils to optimize the field homogeneity.

Another feature of the present invention is the same as any one or more of the preceding features wherein the automatic field homogeneity control channel employs a group of gyromagnetic resonant bodies which are disposed in essentially the same region of the probe as the sample under analysis whereby the magnetic field is homogenized within the sample under analysis.

Other features and advantages of the present invention will become apparent upon a perusal of the following specification taken in connection with the accompanying drawing.

BRIEF DESCRIPTION OF THE DRAWING

The drawing is a schematic block diagram fo a gyromagnetic resonance spectrometer employing features of the present invention.

DESCRIPTION OF THE PREFERRED EMBODIMENTS

Referring now to the drawing, a gyromagnetic sample of matter to be investigated, such as the protons in ethyl alcohol, and a first control group of gyromagnetic bodies, such as the protons in tetramethylsilane (TMS), are disposed in a conventional analysis resonance probe structure 1. The first control group and the sample may be intermixed in a common container or may be separated into adjacent containers which may be concentric or coaxial and axially partitioned. In this manner, the control and sample groups occupy essentially the same regions of space. The analysis probe 1 is immersed in a uniform unidirectional magnetic field $H_0$, as of 14 kg. intensity. A second control group of gyromagnetic bodies, such as water or TMS, is disposed in a separate control resonance probe 2 which is immersed in the same unidirectional magnetic field $H_0$.

A control radio frequency transmitter 3 at $f_0$ of, for example, 60 mHz. feeds its output via gate 4 to the transmitter coils of the analysis and control probes 1 and 2, respectively, for applying an alternating magnetic field component at right angles to the polarizing field $H_0$ to excite gyromagnetic resonance of both control groups. A pair of radio frequency amplifiers 5 and 6 are connected to the receiver coils of the probes 1 and 2, respectively, for receiving and amplifying the gyromagnetic resonance signals of the two control groups at $f_0$. The outputs of the two receivers 5 and 6 at $f_0$ are fed to two phase sensitive detectors 7 and 8, respectively, wherein they are compared with samples of the control transmitter signal at $f_0$ which has been phase shifted by a 90° phase shifter 9. The outputs of the two phase sensitive detectors 7 and 8 are two dispersive mode D.C. resonance signals. The output of the phase sensitive detector 7 or 8 as selected by switch 12 is a D.C. error signal which is fed to a controller, not shown, for correcting the magnitude of the polarizing field $H_0$ such that the control groups will be resonant at $f_0$. In other words, resonance of the control groups serves to maintain a predetermined fixed ratio between the frequency $f_0$ and the field $H_0$. Typically, the external control group in the control probe 2 has a broader resonance line due to gradients in the field $H_0$ and, thus, may be used for control when the sample under analysis and the internal control group are being replaced in the analysis probe 1. When the internal control group is present, control is switched to the internal control group in the analysis probe 1.

A sample analysis transmitter 14 at frequency $f_1$ which may be scanned over a range, for example, of plus and minus 20 kHz relative to $f_0$ feeds its output via a gate 15 to the analysis probe 1 for applying an alternating magnetic field at $f_1$ to the sample group to excite resonance thereof. The resonance of the sample group at $f_1$ is picked up and amplified by amplifier 5 and phase sensitive detected by phase detector 16 against a sample of the analysis transmitter signal at $f_1$ to produce a D.C. absorption mode resonance signal. The resonance signal is fed to a recorder 17 for recording as a function of time or frequency scan to obtain a spectrum of the sample under analysis.

A spin-decoupler transmitter 18 at frequency $f_2$ which may be scanned over a range, for example, of plus or minus 20 kHz. relative to $f_0$ feeds its output through gate 15 to the analysis probe 1. The spin decoupling signal provides an alternating magnetic field at $f_2$ for exciting resonance of gyromagnetic bodies which are spin coupled to the sample group under analysis. When resonance is excited in the spin coupled group it is magnetically decoupled from the group under analysis and certain unwanted line splittings are prevented.

The control transmitter 3, analysis transmitter 14 and spin-decoupler transmitter 18 each includes its respective frequency generating portion of a frequency synthesizer 19 as indicated by the dotted line 20. The freqency synthesizer 19 derives each of the frequencies $f_0$, $f_1$ and $f_2$ from a common frequency source as by frequency multiplication and division such that the frequencies $f_0$, $f_1$ and $f_2$ maintain the same relative ratios to each other. Thus, the field-frequency control channel which corrects the magnetic field intensity $H_0$ to maintain a constant ratio of $f_0$ to $H_0$ also corrects for the frequency deviations of the other frequencies $f_1$ and $f_2$. The analysis transmitter frequency $f_1$ and the spin decoupler frequency $f_2$ are each separately controlled by analysis frequency controller 21 and spin decoupler frequency controller 22 which operate upon the frequency synthesizer 19. A frequency scanner 23 feeds its output to the recorder 17 and to the analysis frequency controller for scanning the frequency of the analysis transmitter $f_1$.

A pair of magnetic field shim coils 24 are disposed in the field $H_0$ straddling the analysis probe 1 for producing a corrective linear gradient in the magnetic field in the direction of the field $H_0$. The corrective gradient is adjusted by controlling the D.C. current through the coils 24 as supplied from a current control 25. The current control 25 is adjusted to produce a certain corrective gradient which bucks-out any of that certain residual gradient within the sample under analysis. A low frequency modulator 26 modulates the D.C. current in the gradient cancelling coils 24 at a low frequency, as of 1 Hz. to modulate the absorption mode resonance line height of the control group within the analysis probe 1. A phase sensitive detector 27 compares the internal control resonance signal with a sample of the control transmitter signal at $f_0$ to produce an absorption mode D.C. resonance signal which is fed to one input of a low frequency phase detector 28. The low frequency phase detector 28 compares the D.C. absorption mode control resonance line with a sample of the low frequency modulation to obtain a D.C. error signal which is fed to the current controller 25 to control the D.C. current to the gradient cancelling coils 24 for optimizing the uniformity of the polarizing magnetic field $H_0$ within the sample under analysis.

The spectrometer is pulsed in that a pulse generator 29 sends pulses to gates 4 and 15 to block the transmitter signals at the same time as the pulse generator 29 sends signals to the receivers 5 and 6 to unblock their outputs. Thus, the pulse generator 29 provides control pulses such that when the outputs of the transmitters 3, 14 and 18 are blocked the outputs of the receivers 5 and 6 are unblocked and vice versa. A suitable duty cycle and pulse rate for the transmitters 3, 14 and 18 is one in which they are unblocked for $1\mu$ second of each $10\mu$ second period, whereas, the receivers 5 and 6 are blocked for the initial $2\mu$ seconds of each $10\mu$ second period. In this manner the receivers 5 and 6 are blocked for $1\mu$ second after the transmitter pulses in order to prevent direct coupling from the transmitters to receivers due to ringing of the tuned circuits. This duty cycle producers resonance sidebands at 100 kHz. but this is outside the scanned bandwidth of the spectrometer. The advantage of the pulsed spectrometer is that base-line instability due to leakage between transmitters and receivers is substantially reduced. Also probe balance is much less critical, i.e., adjustment of the positions of the transmitter and receiver coils within the probes to prevent direct R.F. coupling therebetween.

Since many changes could be made in the above construction and many apparently widely different embodiments of this invention can be made without departing from the scope thereof it is intended that all matter contained in the above description or shown in the accompanying drawings shall be interpreted as illustrative and not in a limiting sense.

I claim:

1. In a gyromagnetic resonance spectrometer, transmitter means for applying alternating magnetic fields to both a sample group to be analyzed and a control group of gyromagnetic bodies in a unidirectional magnetic field to excite gyromagnetic resonance of both groups, receiver means for receiving gyromagnetic resonance signals from both groups and for producing an output resonance signal and an output control signal, means for alternately blocking the outputs of said transmitter means and said receiver means such that when the output of said transmitter means is blocked the output of said receiver means is unblocked and vice versa, the improvement comprising, means for applying a corrective magnetic field gradient to the sample and control groups to cancel certain residual magnetic field gradients in the polarizing magnetic field therein, means for modulating the intensity of the corrective field gradient to produce a corresponding modulation in the resonance of the control group, and means responsive to the resonance modulation of the output control signal of the control group to derive a signal for controlling said means for applying the corrective magnetic field gradient to optimize the corrective magnetic field gradient.

2. The apparatus of claim 1 wherein said transmitter means includes a radio freqency coil and said control and sample groups are disposed within said coil.

3. The apparatus of claim 1 wherein said receiver means includes, a first phase detector means for detecting the sample resonance signal to produce the sample resonance output signal, and a second phase detector means for detecting the control resonance signal to produce the signal for optimizing the corrective magnetic field gradient.

4. The apparatus of claim 3 including a third phase detector means operable upon the control resonance signal to derive a field-frequency control signal for controlling the ratio of the frequency of the applied control resonance exciting alterating magnetic field to the intensity of the unidirectional magnetic field to sustain resonance of the control group.

5. The apparatus of claim 1 wherein said transmitter means includes means for applying an alternating magnetic field at a third frequency to the sample under analysis to excite resonance of a group of gyromagnetic bodies spin coupled to the sample group under analysis to spin-decouple the two sample groups.

6. The apparatus of claim 1 wherein said means for applying a corrective gradient to the sample and control groups includes an electrical coil, and means for exciting said coil with direct current of a variable magnitude.

7. The apparatus of claim 6 wherein said means for modulating the intensity of the corrective field gradient includes means for modulating the intensity of the direct current in said coil.

8. The apparatus of claim 7 wherein said means to derive a signal to optimize the corrective gradient includes, a phase sensitive detector for comparing a sample of the field gradient modulation signal with the modulated control resonance signal to obtain the signal to optimize the corrective magnetic field gradient.

References Cited

UNITED STATES PATENTS

| 3,358,222 | 12/1967 | Hyde | 324—0.5 |
| 3,388,322 | 6/1968 | Anderson | 324—0.5 |

OTHER REFERENCES

Baker et al.—Time Sharing Modulation at 200 kc. Applied to Broad and Narrow Line NMR for Base-Line Stability—Rev. of Sci. Instr. 36(10)—pp. 1495–1498.

GERARD R. STRECKER, Primary Examiner

MICHAEL J. LYNCH, Assistant Examiner